Figure 1:
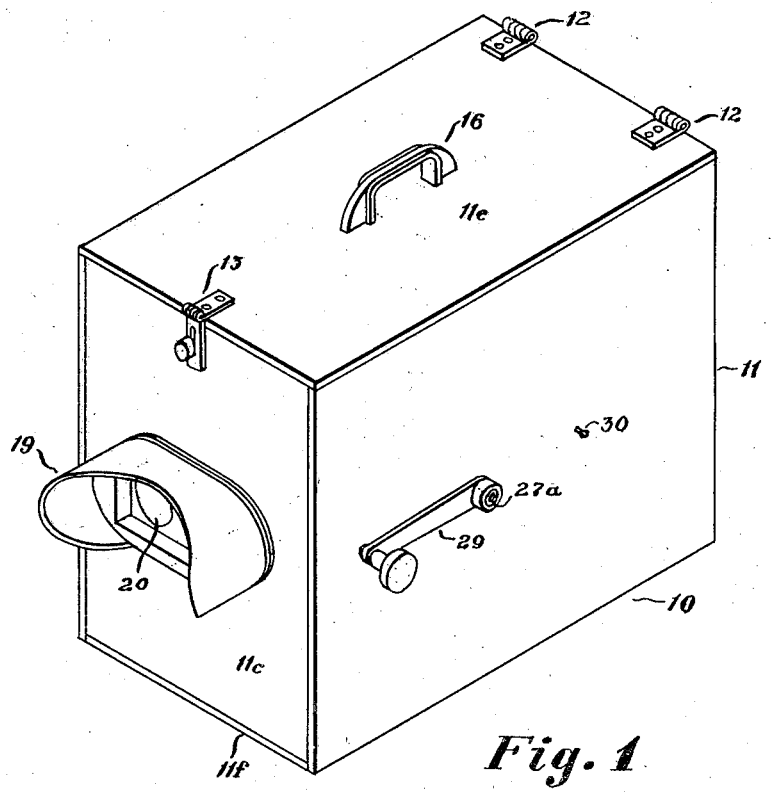

Inventor
Robert E. McClure
By Frease and Bishop
Attorneys

Robert E. McClure

Inventor
*Robert E. McClure*

Patented May 29, 1945

2,377,021

UNITED STATES PATENT OFFICE 2,377,021

VIEWER WITH MAGAZINE FEED FOR COLOR TRANSPARENCIES AND THE LIKE

Robert E. McClure, Warren, Ohio

Application August 6, 1942, Serial No. 453,790

15 Claims. (Cl. 88—31)

My invention relates to viewers with magazine feeds for color transparencies and the like, and more particularly stereoscopic color transparencies, preferably the 2¼" x 2¼" size.

In the direct viewing of a picture in a color or other transparency, a source of light, which should be diffused, passes the diffused light through the transparency or pair of stereoscopic transparencies and through a lens or stereoscope lenses to the eyes of the observer.

Viewers for opaque pictures or photographs where the opaque pictures are seen by reflected light are relatively easy to provide with a magazine feed for succeeding pictures, by providing a housing or case in which light is reflected from a source adjacent the front viewing aperture or apertures in the case, and reflected on each of a series of succeeding opaque pictures which may be mounted on an endless conveyor or on a drum, means being provided for flapping each succeeding picture into the viewing position where the light from the light source illuminates the picture and reflects the image of the picture back through the viewing aperture or apertures, which in the case of opaque stereoscopic pictures are provided with stereoscope lenses.

In the case of transparencies however, it is necessary that the light source be on the side of the transparency opposite the observer, so that the light will pass through the transparency or transparencies to the eyes of the observer, and the provision of a magazine feed for a series of transparency mounts which would operate to successively place each mount between the light source and the observer in proper position for viewing was a problem which was unsolved prior to the present invention according to available information.

A viewer with a magazine feed for color transparencies and the like, preferably contained in a portable housing or case, is particularly useful for advertising purposes by manufacturers of articles in color particularly for use in homes. The showing preferably in three dimensional form of articles in their various color combinations to prospective purchasers has been a very difficult problem, particularly in the case of articles such as colored wall and floor coverings including wall paper, paint, rugs, carpet, linoleum, tile, and the like, and such as curtains, drapes, furniture, and ornaments, and such as dinnerware, enamel kitchen ware, and dining and kitchen utensils, and articles such as white enamel kitchen cabinets, sinks, stoves, and refrigerators, usually used in conjunction with colored wall and floor coverings, curtains, drapes, furniture, and ornaments.

By providing a viewer with a magazine feed for a series of color transparency mounts the display to prospective purchasers in their various color combinations of articles such as listed above, preferably in three dimensional form, is very greatly facilitated.

The objects of the present invention include the provision of an improved viewer with magazine feed for a series of transparencies, particularly stereoscopic color transparencies, and in which each succeeding transparency is placed between a source of light and the observer in proper position for viewing, and in which the entire series of transparencies may be continuously viewed one after the other, over and over again.

Further objects of the present invention include the provision of such an improved viewer with magazine feed for color transparencies and the like, in which the parts are arranged for enabling easy and rapid loading and unloading of transparencies preferably in mounts, into and out of the magazine for enabling the viewer to be supplied with changes of sets of transparencies.

Further objects of the present invention include the provision of such an improved viewer with magazine feed for color transparencies and the like, and in which the parts are constructed and arranged for convenient assembly and disassembly.

Further objects of the present invention include the provision of such an improved viewer with magazine feed for color transparencies and the like, and which may be made by the use of a large proportion of non-metallic material, such as wood composition including pressed wood, plywood, and the like, or plastic material.

Further objects of the present invention include the provision of an improved viewer with magazine feed for color transparencies and the like, the improved viewer being of simplified construction and arrangement, and adapted for easy and economical manufacture and maintenance regardless of the material of which it is made.

Further objects of the present invention include the provision of an improved mechanism for providing rotary oscillations about an axis for one member and intermittent partial rotations in the same direction of another member or members about the same axis by the oscillations of the first member.

The foregoing and other objects are attained by the viewer with magazine feed for color transparencies and the like, constructions, parts, combinations, and sub-combinations, comprising the present invention, and the nature of which is set forth in the following general statement, and preferred embodiments of which are set forth in the following description, and which are particularly and distinctly pointed out and set forth in the appended claims forming part hereof.

The nature of the improved viewer with magazine feed for color transparencies and the like of the present invention may be stated in general terms as including preferably in a housing or case, a cradle oscillatable about an axis. A pair of laterally spaced magazine annular or ring disks are operatively mounted for rotation about the same axis and about the cradle.

The cradle includes a slot frame with a slot end for receiving, supporting and discharging a color transparency or the like usually in a transparency mount, and the cradle also includes a source of light, preferably a source of diffused light, at one side of the slot frame for transmitting light through a transparency contained in the slot frame.

The housing has preferably two viewing apertures with stereoscope lenses therein formed in a wall on the side of the axis opposite the light source, when the cradle is in position for viewing a transparency in its slot frame.

The magazine ring disks are provided with opposite pairs of inwardly opening radial channels or grooves, each pair of channels being adapted for receiving the side end borders of a transparency mount or the like.

The cradle includes arcuate side tracks and other arcuate tracks are located on the outer sides of the ring disks and between the ring disks and the cradle for providing supports for the transparency mounts or the like which are located in the opposite pairs of channels and being conveyed by the ring disks.

Improved means are provided for converting the oscillations of the cradle to intermittent partial rotations of the ring disks and the channels and transparency mounts located in the channels, so as to successively invert the slot frame from a position with the slot end opening vertically upwardly to a position with the slot end opening vertically downwardly into a vertically alined pair of channels, and to return the cradle to a position alining the then upwardly opening slot end of the slot frame with a pair of the channels advanced to the upper vertical position during oscillation of the cradle.

Figure 2:
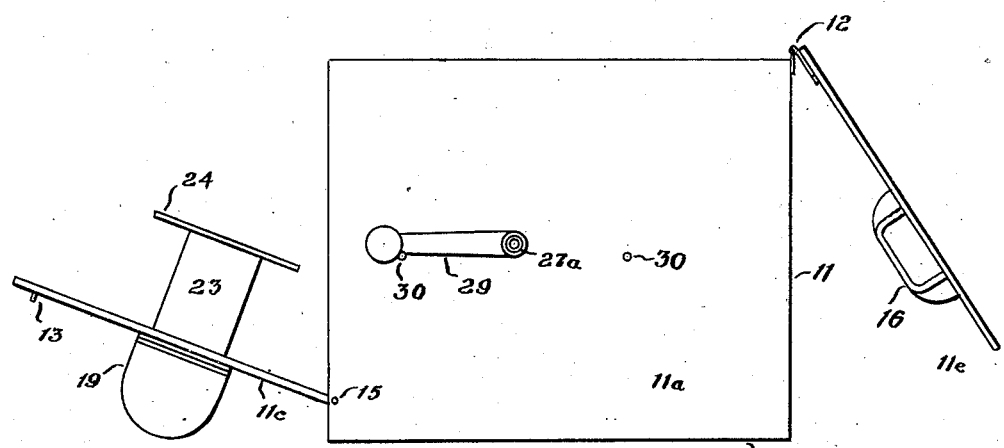
Figure 3:
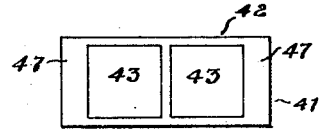
Figure 4:
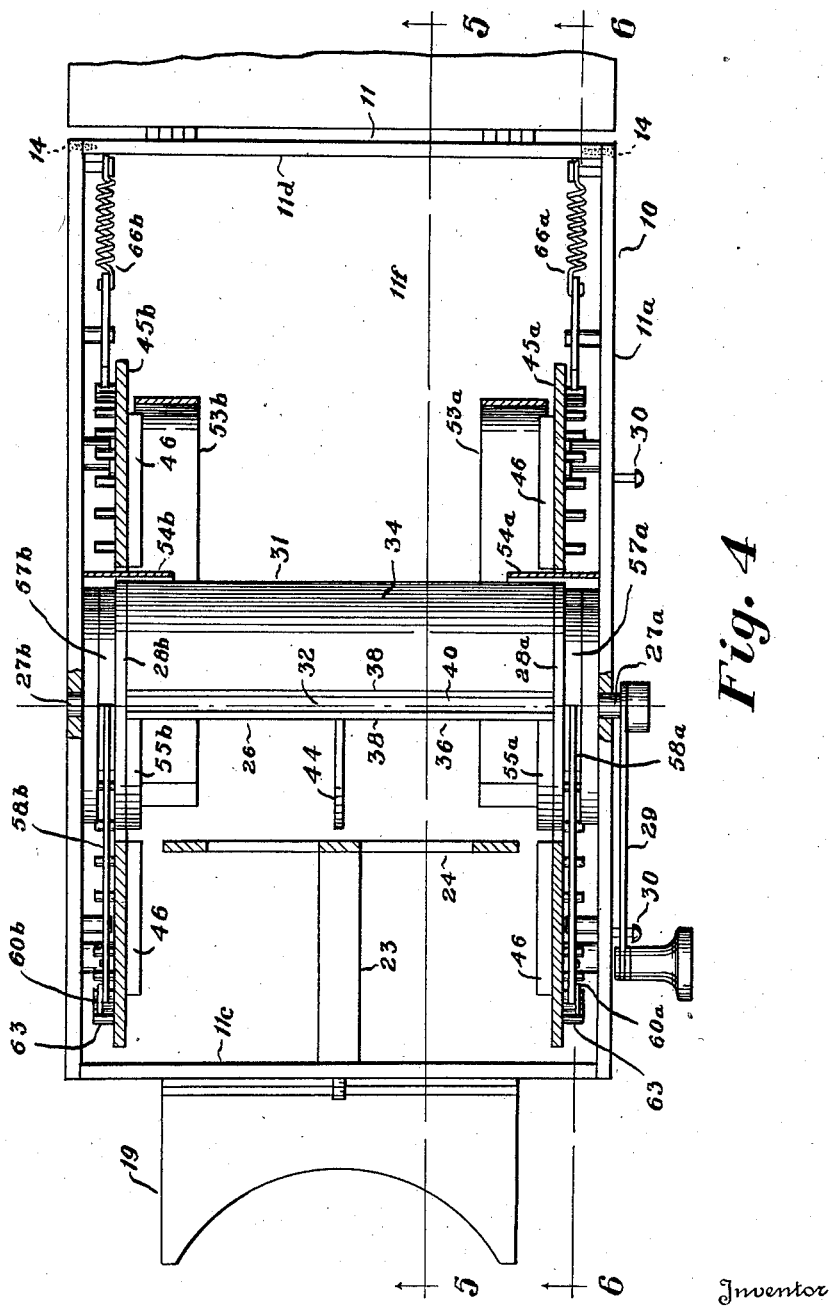
Figure 5:
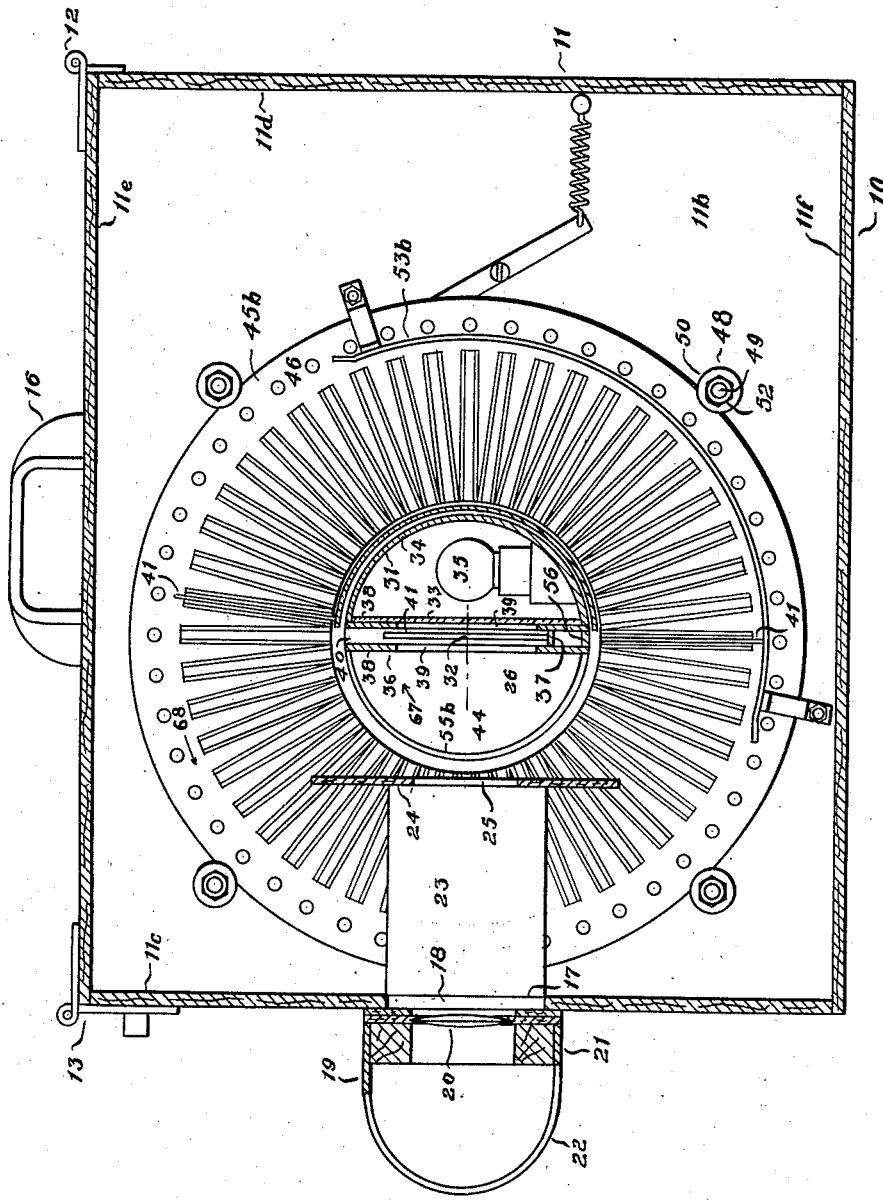
Figure 6:
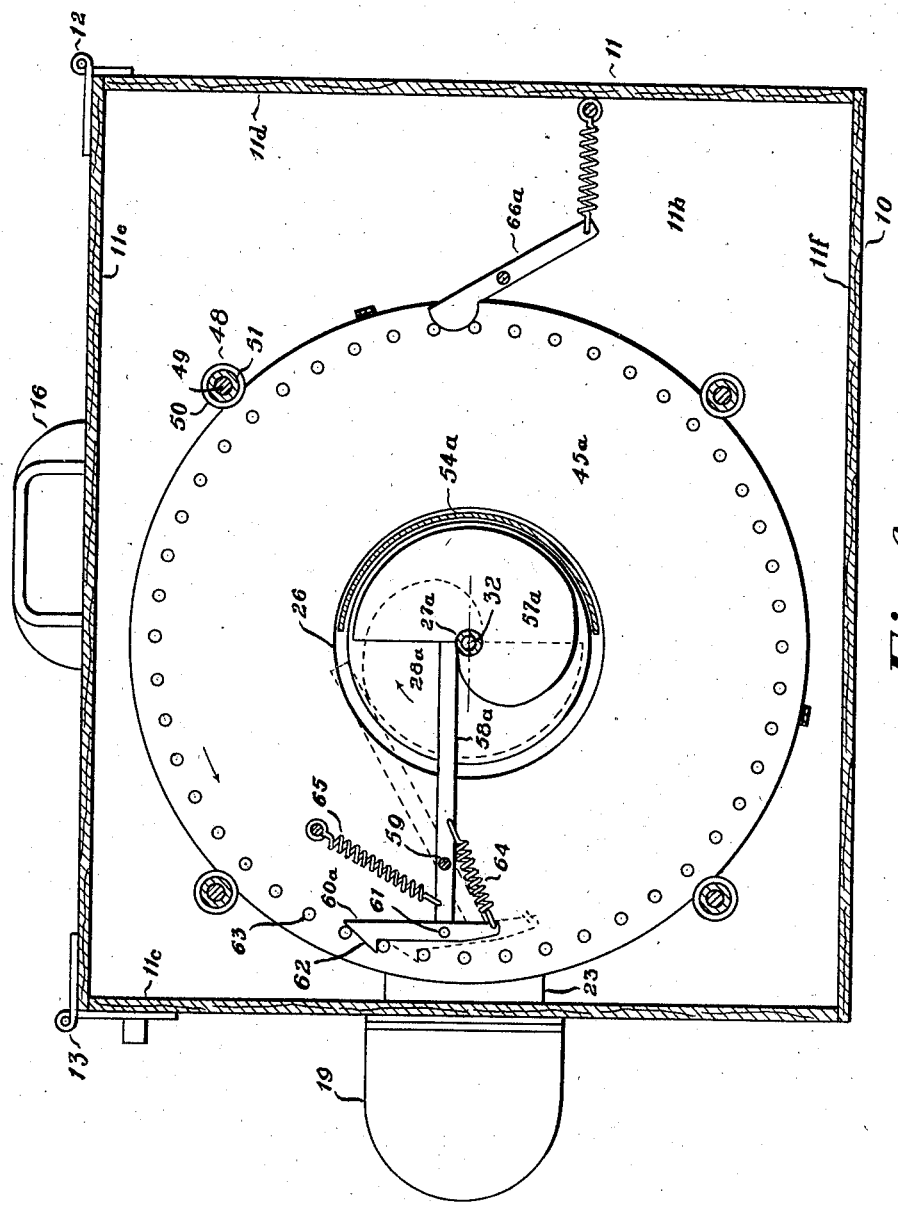

By way of example, preferred embodiments of the improved viewer with magazine feed for color transparencies and the like and parts thereof are illustrated in the accompanying drawings forming part hereof, in which Figure 1 is an isometric view of a preferred portable embodiment of the improved viewer;

Fig. 2, a side elevation thereof showing the preferred hinged top wall of the case swung open and the preferred hinged front wall having a hooded stereoscope lens mounting assembly thereon also swung open for permitting easy access to the parts in the interior of the case for insertion and removal of the transparency mounts in the magazine ring disks;

Fig. 3, a front elevation view of a stereoscope transparency mount including a frame and two stereoscope transparencies therein;

Fig. 4, a top plan view enlarged relative to Figs. 1 and 2 of the improved viewer with the top wall of the case removed, and portions in section;

Fig. 5, a longitudinal vertical section thereof as on line 5—5, Fig. 4, and with the top wall and carrying handle in place; and Fig. 6, a vertical sectional view thereof as on line 6—6, Fig. 4.

Similar numerals refer to similar parts throughout the several views.

The improved viewer with magazine feed for color transparencies and the like is indicated generally by 10, and includes a housing or case indicated generally by 11 having opposite rectangular side walls 11a and 11b, opposite rectangular front and rear walls 11c and 11d, and opposite top and bottom walls 11e and 11f.

The housing walls may be made of composition such as pressed wood, plywood, or similar material. The top wall 11e is preferably hinge connected at its rear end with the upper end of the rear wall 11d as by hinges 12, and the front end of the top wall 11e is preferably releasably connected with the top end of the front wall 11c as by hasp means 13. The bottom and rear borders of the side walls 11a and 11b are preferably separably connected as by screws 14 with the side edges of the bottom wall 11f and the rear wall 11d. The front wall 11c is preferably hinged at its lower end between the side walls 11a and 11b as by pivot pins 15.

By this preferred construction of the case 11 certain of the parts of the improved viewer as hereinafter set forth in detail may be assembled on the inner faces of each of the side walls 11a and 11b before the same are separably secured to the bottom and rear walls 11f and 11d, and the hinging of the top wall 11e on the rear wall 11d, and the hinging of the front wall 11c between the side walls 11a and 11b permits swinging of the top and front walls to the open positions shown in Fig. 2, whereby access may be had to the parts within the case for loading and unloading the magazine.

The improved viewer 10 as shown is preferably a portable viewer which may be used for advertising purposes, and a handle 16 is secured upon the upper face of the top wall 11e for carrying the viewer 10 from place to place.

The front wall 11c has spaced rectangular apertures 17 formed therein preferably midway between the top and bottom walls 11e and 11f and equally spaced on opposite sides of the vertical median plane of the case 11, and the front wall 11c thus includes a vertical web 18 bounding adjacent inner sides of the apertures 17.

A hooded lens mounting assembly indicated generally by 19 is secured upon the outer face of the front wall 11c across the apertures 17, and includes a pair of stereoscope lenses 20, each lens 20 being in front of and alined with one of the apertures 17, mounting frame means indicated generally by 21 for mounting the lenses 20 and for connection with the front wall 11c, and a usual stereoscope hood 22 about and extending forward from the lenses 20 and lens frame means 21.

A rectangular light separator wall 23 is secured at its front end to the web 18 of the front wall 11c and extends rearwardly therefrom in the vertical median plane of the case 11.

Upon the rear end of the light separator wall 23 is secured a transverse light shield frame 24 having rectangular apertures 25 formed therein on opposite sides of the separator wall 23 and in alinement with the front wall apertures 17.

An oscillatable transparency illuminating cradle indicated generally by 26 is operatively mounted within the case 11, and extends across the case at the rear of the transverse light shield frame 24. The cradle 26 includes at its opposite ends alined trunnions 27a and 27b projecting outwardly from the laterally spaced circular disks 28a and 28b, which are laterally spaced respectively from the inner faces of the case side walls 11a and 11b.

The trunnions 27a and 27b are journalled respectively in the side walls 11a and 11b, and the trunnion 27a extends through the side wall 11a and has secured on its outer end a crank 29 which is manually oscillatable back and forth through an angle of 180° between stop pins 30 extending outwardly from the outer face of the side wall 11a, the cradle 26 moving with the crank.

Within the case 11, the cradle 26 furthermore includes a cylindric segment electric lamp housing indicated generally by 31 extending longitudinally between the disks 28a and 28b and having its ends connected therewith, and the housing 31 includes a light diffuser sheet 33 on its plane side offset from one side of the axis of oscillation or pivoting 32 of the cradle 26 and its trunnions 27a and 27b.

The housing 31 furthermore includes a cylindric segment outer wall 34 curved about the axis 32, and the elemental longitudinally extending side edges of the curved wall 34 join the longitudinal side edges of the diffuser sheet 33 parallel with the axis 32.

Within the housing 31 a plurality of electric lamps 35 are located between the diffuser sheet 33 and the curved wall 34.

The cradle 26 furthermore includes a transparency slot frame indicated generally by 36 extending longitudinally between the disks 28a and 28b at the plane side of the lamp housing 31.

The slot frame 36 is in the form of an elongated deep U having a bottom wall 37 and parallel side walls 38 which are parallel with an offset on opposite sides of the axis 32, one side wall 38 being in abutment with the plane side of the lamp housing 31.

The side walls 38 each have formed therein a rectangular aperture 39 at each side of the vertical median plane of the case 11, and the pairs of apertures 39, 25, and 17 are alined with each other and with the lenses 20.

The slot frame 36 has an open slot end 40 opposite the bottom wall 37, and the slot frame 36 is adapted to receive through the slot end 40, to hold between the side walls 38 and on the bottom wall 37, and to discharge from the slot end 40, a stereoscope transparency mount 41 which includes in a usual cardboard frame 42 a pair of stereoscope transparencies 43, the transparencies 43 being preferably color transparencies, and being laterally spaced the proper distance for stereo viewing.

When a stereoscope transparency mount 41 is inserted in the slot frame 36, each transparency 43 of the mount 41 is alined with one set of the apertures 39 in the slot frame, and the apertures 25, 17 and the lens 20 alined therewith, when the cradle is in the position shown in Fig. 5, with the slot end 40 of the slot frame 36 opening upwardly.

In this position, light from the lamps 35 diffuses through the diffuser sheet 33 and the preferably color pictures comprising the transparencies in the transparency mount 41, whereby the color pictures may be viewed in color stereo form by a person looking through the stereoscope lenses 20.

The cradle 26 furthermore preferably includes a circular segment light separator disk 44 extending at right angles to the axis 32 in the vertical median plane of the case 11 from the slot frame side wall 38 opposite the lamp housing 31.

For providing a magazine feed for successive transparency mounts 41 into and out of the slot frame 36 as the cradle 26 is oscillated by operation of the crank 29, rotatable magazine annular disks 45a and 45b are located about the outer peripheries and in the planes of the cradle disks 28a and 28b.

On its inner face each magazine annular disk 45a and 45b has a plurality of radial inwardly opening channels 46. As shown the annular disks 45a and 45b are made of wood composition material, and the channels 46 are formed from sheet metal having a shallow U transverse cross section, the channels 46 being secured to the annular disks 45a and 45b as by glue, rivets, or eyelet fasteners.

When desired, the annular disks may be molded of plastic material or cast of metal with the radial channels formed directly therein, or the radial channels may be cut directly by a rotary cutter, router, or other tool in one face of an annular disk made either of wood, wood composition, plastic, metal, or other cuttable material.

Each pair of opposite channels 46 on the opposite annular disks 45a and 45b serves to slidably receive the shorter side borders or ends 47 of a transparency mount 41.

In Fig. 5, a transparency mount 41 is shown in the slot frame 36 of the cradle 26, another mount 41 is shown in the pair of channels 46 immediately to the right of the upper vertical pair, and another mount 41 is shown in the pair of channels 46 vertically below the slot frame 36.

The lower transparency mount 41 has been dropped into its channels when the cradle 26 has been immediately previously rotated so that the slot end 40 opened vertically downwardly.

The magazine annular or ring disks 45a and 45b are operatively mounted for rotation by bearing means extending respectively from the adjacent side walls 11a and 11b and engaging the peripheries of the disks.

As shown, the bearing means for each ring disk 45a and 45b includes a plurality of roller spool bearing units each indicated generally by 48 and including a stub shaft 49 extending from one of the side walls 11a or 11b, and a roller spool 50 on the shaft 49 in roller engagement with the periphery of one of the annular disks 45a or 45b, the roller 50 being spaced from its side wall by a sleeve 51 and being retained on the stub shaft 49 by a nut 52 screwed on the threaded outer end of the stub shaft 49.

Lower and outer circular arcuate tracks 53a and 53b are secured respectively to the walls 11a and 11b and are spaced from the outer ends of the channels 46.

In annular spaces provided between the cradle disks 28a and 28b and the magazine ring disks 45a and 45b, inner circular arcuate tracks 54a and 54b extend respectively from the side walls 11a and 11b.

The ends of the inner circular arcuate tracks 54a and 54b terminate in a vertical plane offset from the axis 32 the same distance as the offset of the slot frame side walls 38, so that the upper ends of the inner circular arcuate tracks 54a and 54b clear the vertical pair of channels 46 and the slot end 40 of the slot frame 36 when the slot end 40 opens vertically upwardly.

The cradle 26 also includes circular arcuate side tracks 55a and 55b extending laterally from the opposite inner faces of the disks 45a and 45b, the side tracks 55a and 55b being on the side of the slot frame 36 opposite the lamp housing 31, and the ends of the arcuate tracks 55a and 55b terminate at the adjacent side wall 38 of the slot frame 36.

As shown, the side walls 38 of the slot frame 36 extend transversely entirely across the disks 28a and 28b. The slot frame bottom wall 37 which supports the transparency mount 41 in the slot frame, is spaced from the periphery of the disks 28a and 28b, and for retaining the mount in the upper vertical pair of channels 46 when the slot end 40 of the slot frame 36 opens vertically downwardly, the slot frame 36 has a peripheral wall 56 between the outer edges of the side walls 38 and radially spaced beyond the slot bottom wall 37, the outer ends of the peripheral wall 56 constituting extensions of the abutting ends of the arcuate side tracks 55a and 55b.

Profile cams 57a and 57b are secured respectively on the trunnions 27a and 27b on the outer sides of the cradle disks 28a and 28b, and the profile cams thus rotate with the cradle 26.

Cam and spring operated actuating levers 58a and 58b are pivoted respectively on the side walls 11a and 11b as by pivot bolt means 59. The levers 58a and 58b are located between the side walls and the adjacent cradle disks and magazine ring disks.

The inner end of each lever 58a and 58b extends respectively in abutment across the top of its profile cam 57a and 57b. On the outer ends of the levers 58a and 58b, ratchet levers 60a and 60b are pivoted respectively by pins 61. The upper end of each ratchet lever 60a and 60b has a pawl hook 62. From the outer side of each magazine ring disk 45a and 45b ratchet pins 63 extend outwardly, and are equally spaced on a circular circumference, one for each channel 46 on the inner faces of the ring disks, as shown, each ratchet pin being on the median radial line of one of the channels.

Each ratchet lever 60a and 60b successively engages its pawl hook 62 behind one of the ratchet pins 63. A ratchet lever spring 64 extends and is connected between each ratchet lever 60a and 60b and its mounting and actuating lever 58a and 58b respectively, the spring 64 urging the upper pawl hooks 62 of the ratchet levers outwardly against the ratchet pins 63.

An actuating lever spring 65 extends and is connected respectively between each actuating lever 58a and 58b and the adjacent side wall 11a and 11b. The connection of each spring 65 with its lever is on the outer side of its pivot bolt 59, and the springs 65 urge the outer ends of the levers 58a and 58b upwardly, and the inner ends downwardly against the cam faces of the profile cams 57a and 57b respectively.

For facilitating the coordinated intermittent rotary motion of the magazine ring disks 45a and 45b and their coordinated stopping with upper and lower pairs of the channels 46 in vertically alined positions after each oscillation of the crank 29 and the cradle 26, spring actuated ratchet stop means 66a and 66b are operatively mounted on the side walls 11a and 11b and associated with ratchet pins 63 at the rear of the axis of rotation 32.

In operation, when the parts of the improved viewer and the transparency mounts 41 are in the positions shown in Fig. 5, the profile cams 57a and 57b and their respective levers 58a and 60a and 58b and 60b, and their springs, are in the positions shown in Fig. 6. Rotation of the cradle 26 by means of the crank 29 in the direction of the arrow 67 serves to elevate the inner ends of the levers 58a and 58b to the position shown for the lever 58a in dotted lines in Fig. 6, simultaneously rotating in the direction of the arrow 68 the magazine ring disks 45a and 45b by the ratchet levers 60a and 60b having their pawl hooks 62 engaged with an alined pair of the ratchet pins 63.

When the slot frame 36 of the cradle 26 reaches the position in which its slot end 40 opens vertically downward, the lower vertical pair of channels 46 with the lower transparency mount 41 therein as shown in Fig. 5 will have been advanced on the tracks 53a and 53b the arcuate distance between adjacent ratchet pins 63, and the angular distance between the radial median lines of adjacent channels 46.

The upper transparency mount 41 in the upper set of channels 46 as shown in Fig. 5 will also have been advanced to the vertical position riding on the tracks 55a and 55b of the cradle 26.

The transparency mount 41 in the slot frame 36 will drop into the next now lower vertical pair of channels 46, and reverse rotation of the crank 29 will return the cradle 26 and its slot frame 36 so that its slot end 40 opens upwardly and the frame 36 is in the upwardly opening vertical position as shown in Fig. 5, and in this position the transparency mount 41 which has been advanced to the upper vertical position drops into the slot frame 36 through the then upper slot end 40.

The lamps 35 are arranged for intermittent or continuous illumination through suitable switch means and electrical connection not shown with a source of electric power.

The transparencies of each succeeding mount 41 are viewed by a person looking through the lenses 20 as the mount drops into the upwardly opening slot frame 36, and the transparencies of each mount may be viewed as long as desired, until the crank 29 is again oscillated.

The outer magazine ring disks 45a and 45b and the transparency mounts 41 conveyed in the channels thereof always rotate in the direction of the arrow 68, whereas the cradle 26 oscillates back and forth from the position shown in Fig. 5, first in the direction of the arrow 67 and then in the reverse direction.

In actual use, all the pairs of channels 46 on the rear side of the axis of rotation and oscillation 32 are filled with transparency mounts 41, so that the succeeding mounts are dropped into the slot frame 36 from above each in the proper position for viewing, and by the inversion of the slot frame 36 on the rotation of the cradle 26 in the direction of the arrow 67 are dropped into succeeding pairs of lower vertical channels 46 in proper position for being moved upwardly first supported by the tracks 53a and 53b and then by the tracks 54a and 54b, and 55a and 55b during the complete oscillation of the cradle 26.

As each succeeding transparency mount 41 reaches the upper vertical position it drops into the upwardly opening slot frame 36 in proper position for viewing.

While the improved viewer 10 as shown and described is for use with stereoscope transparency mounts, it is obvious that transparency mounts with a single transparency therein may be handled in a modified form of the viewer 10 by utilizing a single centrally located lens 20 and eliminating the light separator wall 23, the light shield frame 24, and the circular segment light separator disk 44.

The embodiments of the present improvements illustrated and described herein are by way of example, and the scope of the present invention is not limited to the same or to the particular details thereof, but is commensurate with any and all novel subject matter contained herein which may at any time properly under the United States patent laws be set forth in the claims hereof or originating herein, and the elements of any such claims are intended to include their reasonable functional or structural equivalents.

I claim:

1. In a viewer with magazine feed for color transparencies and the like, walls forming a case, a front case wall having formed therein a viewing aperture, a cradle operatively mounted within the case for oscillation about an axis extending laterally opposite the viewing aperture, two laterally spaced magazine ring disks operatively mounted within the case for rotation about the same axis and about the cradle, means for effecting first and second half oscillations of the cradle through reverse rotary movements of 180°, and motion converting means operative between the cradle and the magazine ring disks for partially rotating the disks through a limited angle during each first half oscillation of the cradle, the cradle including a slot frame having spaced slot side walls on opposite sides of the axis forming a slot and a slot bottom wall between the slot side walls and an open slot end opposite the slot bottom wall, the first half oscillation of the cradle moving the slot frame from an initial position with its slot end opening vertically upwards to an inverted position with its slot end opening vertically downwards, the slot frame side walls having formed therein apertures alined with each other and with the viewing aperture in the initial position, the cradle also including a light source on one side of the axis and slot frame with the slot frame between the light source and the viewing aperture in the initial position, and the magazine ring disks including opposite pairs of oppositely opening channels extending radially of the axis, each pair of channels being adapted to receive the side end borders of a transparency, arcuate tracks on the cradle and arcuate tracks between the cradle and the magazine ring disks and arcuate tracks spaced from the outer sides of the ring disks for providing supports for transparencies located in the opposite pairs of channels and being conveyed by the magazine ring disks during each partial rotation, so that a lower pair of empty channels are moved to a position vertically alined with the slot end opening vertically downwards in the inverted cradle position to receive a transparency from the inverted cradle slot, and an upper pair of channels with a transparency therein are moved to a position vertically alined with the slot end opening vertically upwards upon return of the cradle to the initial position and when the vertical upper transparency will drop into the cradle slot, each pair of channels on one side of the axis and the vertical lower pair having a transparency located therebetween and a transparency being always in the cradle slot when the magazine disks are fully loaded and the viewer is ready for continuous intermittent viewing of the successive transparencies.

2. In a viewer with magazine feed for color transparencies and the like, as set forth in claim 1, and in which the front case wall has a lens mounted in its viewing aperture.

3. In a stereoscope viewer with magazine feed for color transparencies and the like, walls forming a case, a front case wall having formed therein a pair of laterally spaced viewing apertures and mounting a pair of stereoscope lenses, one in each viewing aperture, a cradle operatively mounted within the case for oscillation about an axis extending laterally opposite the lenses, two laterally spaced magazine ring disks operatively mounted within the case for rotation about the same axis and about the cradle, means for effecting first and second half oscillations of the cradle through reverse rotary movements of 180°, and motion converting means operative between the cradle and the magazine ring disks for partially rotating the disks through a limited angle during each first half oscillation of the cradle, the cradle including a slot frame having spaced slot side walls on opposite sides of the axis forming a slot and a slot bottom wall between the slot side walls and an open slot end opposite the slot bottom wall, the first half oscillation of the cradle moving the slot frame from an initial position with its slot end opening vertically upwards to an inverted position with its slot end opening vertically downwards, the slot frame side walls having formed therein apertures alined with each other and with the viewing apertures and lenses in the initial position, the cradle also including a light source on one side of the axis and slot frame with the slot frame between the light source and the lenses in the initial position, and the magazine ring disks including opposite pairs of oppositely opening channels extending radially of the axis, each pair of channels being adapted to receive the side end borders of a stereoscopic transparency, arcuate tracks on the cradle and arcuate tracks between the cradle and the magazine ring disks and arcuate tracks spaced from the outer sides of the ring disks for providing supports for stereoscopic transparencies located in the opposite pairs of channels and being conveyed by the magazine ring disks during each partial rotation, so that a lower pair of empty channels are moved to a position vertically alined with the slot end opening vertically downwards in the inverted cradle position to receive a stereoscopic transparency from the inverted cradle slot, and an upper pair of channels with a stereoscopic transparency therein are moved to a position vertically alined with the slot end opening vertically upwards upon return of the cradle to the initial position and when the vertical upper transparency will drop into the cradle slot, each pair of channels on one side of the axis and the vertical lower pair having a stereoscopic transparency located therebetween and a stereoscopic transparency being always in the cradle slot when the magazine disks are loaded and the viewer is ready for continuous intermittent viewing of the successive stereoscopic transparencies.

4. In a viewer with magazine feed for color transparencies and the like, as set forth in claim 3, and in which a light separator wall extends from the front wall between the apertures and lenses rearwardly and terminates in a rear end adjacent the cradle.

5. In a viewer with magazine feed for color transparencies and the like, as set forth in claim 1, and in which the front case wall is hinged, and the case includes a hinged top wall permitting swinging open of the case front and top walls for providing access to the magazine disks and cradle for loading and unloading transparencies in the magazine disks and cradle.

6. In a viewer with magazine feed for color transparencies and the like, as set forth in claim 1, and in which the case includes opposite separable side walls extending rearwardly from the front wall and in which the cradle includes at its opposite ends trunnions journalled in the side walls.

7. In a viewer with magazine feed for color transparencies and the like, as set forth in claim 1, and in which the case includes opposite separable side walls extending rearwardly from the front wall, and in which the cradle includes at its opposite ends trunnions journalled in the side walls and in which the magazine disks are mounted for rotation on the side walls.

8. In a viewer with magazine feed for color transparencies and the like, as set forth in claim 1, and in which the case includes opposite separable side walls extending rearwardly from the front wall, and in which the cradle includes at its opposite ends trunnions journalled in the side walls and in which the magazine disks are mounted for rotation on the side walls, and in which the motion converting means are located and operative between the disks and the side walls.

9. In a viewer with magazine feed for color transparencies and the like, walls forming a case, a front case wall having formed therein a viewing aperture, a transparency cradle operatively mounted within the case for oscillation about an axis extending laterally opposite the viewing aperture, two laterally spaced magazine ring rotors operatively mounted within the case for rotation about the same axis and about the cradle, means for effecting first and second half oscillations of the cradle through reverse rotary movements about the axis of substantially 180°, and motion converting means operative between the cradle and the magazine ring rotors for partially rotating the rotors through a limited angle during each first half oscillation of the cradle, the cradle including transparency frame members forming laterally spaced grooves opening towards each other and having bottom faces extending transversely of and substantially at right angles to the axis, stop means between one set of ends of the side grooves, the other end of each groove being open for receiving and discharging a side end border of a transparency, the first half oscillation of the cradle moving the cradle from an initial position with the open groove ends above the axis to an inverted position substantially 180° from the initial position with the open groove ends below the axis, the cradle also including a light source on one side of the axis, the frame grooves of the frame members and any transparency therein being between the light source and the viewing aperture in the initial position, and the magazine ring rotors including opposite pairs of radial channels opening towards each other and having bottom faces substantially at right angles to the axis, the bottom faces of the channels having radial medians spaced at equal angles in each rotor, each pair of channels being adapted to receive the side borders of a transparency, arcuate tracks on the cradle and arcuate tracks between the cradle and the magazine ring rotors and arcuate tracks spaced from the outer peripheries of the ring rotors for providing supports for transparencies located in the opposite pairs of channels and being conveyed by the magazine ring rotors during each partial rotation, the cradle transparency frame side grooves having bottom faces in substantially the same planes as the bottom faces of the ring rotor channels, and the open ends of the cradle transparency frame side grooves being registerable in the initial and inverted positions with upper and lower pairs of the channels.

10. In a viewer with magazine feed for successively bringing into position for viewing from the front each of a series of color transparencies and the like requiring light to be passed therethrough from the rear, a transparency cradle operatively mounted for oscillation about an axis which is substantially horizontal in the usual operation of the viewer, two laterally spaced magazine ring rotors operatively mounted for rotation about the same axis and about the cradle, means for effecting first and second half oscillations of the cradle through reverse rotary movements about the axis of substantially 180°, and motion converting means operative between the cradle and the magazine ring rotors for partially rotating the rotors through a limited angle during each first half oscillation of the cradle, the cradle including transparency frame members forming laterally spaced grooves opening towards each other and having bottom faces extending transversely of and substantially at right angles to the axis, stop means between one set of ends of the side grooves, the other end of each groove being open for receiving and discharging a side end border of a transparency, the first half oscillation of the cradle moving the cradle from an initial position with the open groove ends above the axis to an inverted position substantially 180° from the initial position with the open groove ends below the axis, the cradle also including a light source on one side of the axis, the light source being at the rear of the axis and the frame grooves and any transparency therein in the initial and viewing position, and the magazine ring rotors including opposite pairs of radial channels opening towards each other and having bottom faces substantially at right angles to the axis, the bottom faces of the channels having radial medians spaced at equal angles in each rotor, each pair of channels being adapted to receive the side borders of a transparency, arcuate tracks on the cradle and arcuate tracks between the cradle and the magazine ring rotors and arcuate tracks spaced from the outer peripheries of the ring rotors for providing supports for transparencies located in the opposite pairs of channels and being conveyed by the magazine ring rotors during each partial rotation, the cradle transparency frame side grooves having bottom faces in substantially the same planes as the bottom faces of the ring rotor channels, and the open ends of the cradle transparency frame side grooves being registerable in the initial and inverted positions with upper and lower pairs of the channels.

11. In a viewer with magazine feed for successively bringing into position for viewing from the front each of a series of color transparencies and the like requiring light to be passed therethrough from the rear, a transparency cradle operatively mounted for oscillation about an axis which is substantially horizontal in the usual operation of the viewer, two laterally spaced magazine ring rotors operatively mounted for rotation about the same axis and about the cradle, means for effecting first and second half oscillations of the cradle through reverse rotary movements about the axis, and motion converting means operative between the cradle and the magazine ring rotors for partially rotating the ring rotors through each half oscillation of the cradle, the cradle including transparency frame members forming laterally spaced grooves opening towards each other and having bottom faces extending transversely of and substantially at right angles to the axis, stop means between one set of ends of the side grooves, the other end of each groove being open for receiving and discharging a side end border of a transparency, the first half oscillation of the cradle moving the cradle from an initial position with the open groove ends above the axis to an inverted position with the open groove ends below the axis, the cradle also including a light source on one side of the axis, the light source being at the rear of the axis and the frame grooves and any transparency therein in the initial and viewing position, and the magazine ring rotors including opposite pairs of radial channels opening toward each other and having bottom faces substantially at right angles to the axis, the bottom faces of the channels having radial medians spaced at equal angles, each pair of channels being adapted to receive the side borders of a transparency, arcuate track means on the cradle and arcuate track means between the cradle and the magazine ring rotor means and arcuate track means spaced outwardly of the ring rotor means for providing supports for transparencies located in the opposite pairs of channels and being conveyed by the magazine ring rotors during each partial rotation, the cradle transparency frame side grooves having bottom faces in substantially the same planes as the bottom faces of the ring rotor channels, and the open ends of the cradle transparency frame side grooves being registerable in the initial and inverted positions with upper and lower pairs of the channels.

12. In a viewer with magazine feed for successively bringing into position for viewing from the front each of a series of color transparencies and the like requiring light to be passed therethrough from the rear, as set forth in claim 11, and in which the motion converting means includes laterally spaced cam means oscillating with the cradle about the axis, ratchet teeth means on the ring rotors, and lever and pawl means operative between the cam means and the ratchet teeth means for actuation by the cam means to effect the partial rotations of the ring rotors.

13. In a viewer with magazine feed for color transparencies and the like, as set forth in claim 3, and in which a light separator wall extends from the front wall between the apertures and lenses rearwardly and terminates in a rear end adjacent the cradle, and in which the rear end of the light separator wall has mounted thereon a laterally extending light shield frame having laterally spaced apertures formed therein on opposite sides of the separator wall and in alinement with the front wall apertures and lenses.

14. In a viewer with magazine feed for color transparencies and the like, as set forth in claim 3, and in which a light separator wall extends from the front wall between the apertures and lenses rearwardly and terminates in a rear end adjacent the cradle, and in which the cradle includes a light separator disk extending in alinement with the separator wall from the front side of the slot frame when the cradle is in the initial position.

15. In a viewer with magazine feed for color transparencies and the like, as set forth in claim 3, and in which a light separator wall extends from the front wall between the apertures and lenses rearwardly and terminates in a rear end adjacent the cradle, and in which the rear end of the light separator wall has mounted thereon a laterally extending light shield frame having laterally spaced apertures formed therein on opposite sides of the separator wall and in alinement with the front wall apertures and lenses, and in which the cradle includes a light separator disk extending in alinement with the separator wall from the front side of the slot frame when the cradle is in the initial position.

ROBERT E. McCLURE.